(12) United States Patent
Lyubomirsky et al.

(10) Patent No.: US 9,590,799 B2
(45) Date of Patent: Mar. 7, 2017

(54) CLOCK RECOVERY AND EQUALIZER ESTIMATION IN A MULTI-CHANNEL RECEIVER

(71) Applicant: Finisar Corporation, Sunnyvale, CA (US)

(72) Inventors: Ilya Lyubomirsky, Pleasanton, CA (US); The' Linh Nguyen, San Jose, CA (US)

(73) Assignee: FINISAR CORPORATION, Sunnyvale, CA (US)

( * ) Notice: Subject to any disclaimer, the term of this patent is extended or adjusted under 35 U.S.C. 154(b) by 75 days.

(21) Appl. No.: 14/664,810

(22) Filed: Mar. 21, 2015

(65) Prior Publication Data

US 2016/0277175 A1    Sep. 22, 2016

(51) Int. Cl.
*H04B 10/69* (2013.01)
*H04L 7/00* (2006.01)
*H04L 25/03* (2006.01)
*H04L 25/14* (2006.01)

(52) U.S. Cl.
CPC .......... *H04L 7/0075* (2013.01); *H04L 7/0004* (2013.01); *H04L 25/03* (2013.01); *H04L 25/03006* (2013.01); *H04L 25/14* (2013.01)

(58) Field of Classification Search
CPC .................................................... H04B 10/69
See application file for complete search history.

(56) References Cited

U.S. PATENT DOCUMENTS

| 2004/0042504 | A1 | 3/2004 | Khoury, Jr. et al. |
| 2007/0230640 | A1 | 10/2007 | Bryan et al. |
| 2008/0107422 | A1* | 5/2008 | Cole .............. H03M 9/00 398/135 |
| 2009/0141846 | A1* | 6/2009 | Hibi .............. H03K 5/15033 375/376 |
| 2009/0185613 | A1 | 7/2009 | Agazzi et al. |
| 2013/0262909 | A1 | 10/2013 | Yang et al. |

FOREIGN PATENT DOCUMENTS

WO    2008/058256 A2    5/2008

OTHER PUBLICATIONS

International Search Report and Written Opinion of the International Searching Authority mailed Jun. 22, 2016, as received in Application No. PCT/US2016/023466 (12 pages).

* cited by examiner

*Primary Examiner* — Shi K Li
(74) *Attorney, Agent, or Firm* — Maschoff Brennan

(57) ABSTRACT

A method of performing clock recovery and equalizer coefficient estimation in a multi-channel receiver may include recovering, at a first clock recovery unit, a first clock signal associated with a first channel. The method may include estimating a first set of coefficients for a first equalizer associated with the first channel using the first clock signal. The method may include passing the first clock signal to a second clock recovery unit associated with a second channel. The method may also include recovering, at the second clock recovery unit, a second clock signal associated with the second channel using the first clock signal as a reference clock signal. The method may also include passing the first set of coefficients as initialization coefficients to a second equalizer associated with the second channel. The method may also include estimating a second set of coefficients for the second equalizer using the initialization coefficients.

19 Claims, 7 Drawing Sheets

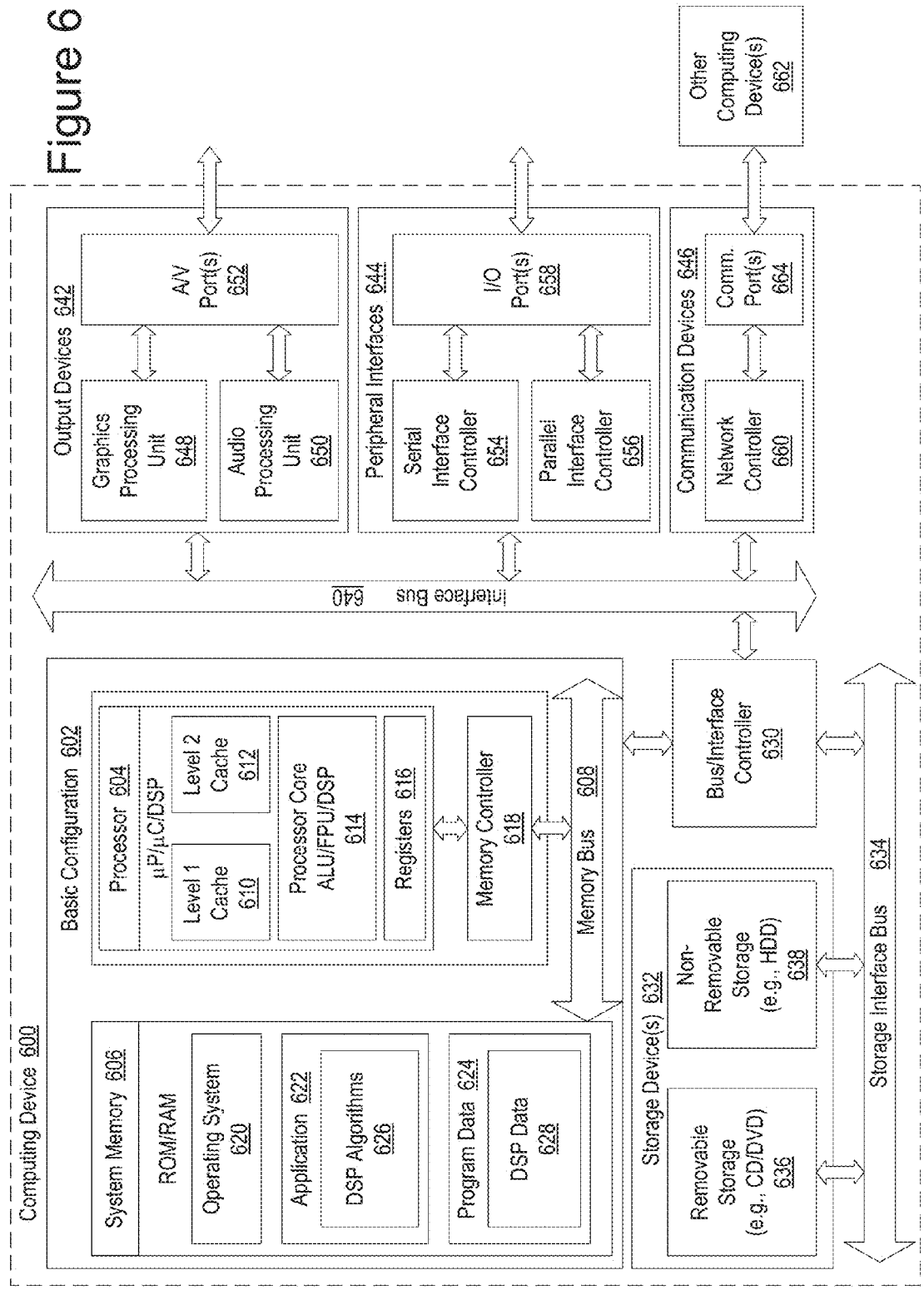

CLOCK RECOVERY AND EQUALIZER ESTIMATION IN A MULTI-CHANNEL RECEIVER

FIELD

Some embodiments described herein generally relate to clock recovery and equalization implementations in multi-channel receivers.

BACKGROUND

Unless otherwise indicated herein, the materials described herein are not prior art to the claims in the present application and are not admitted to be prior art by inclusion in this section.

Signals transmitted through different channels on a multi-mode fiber (MMF) link may experience inter-symbol interference (ISI). Some channels may have severe ISI, causing eye openings in associated eye diagrams to be closed. It may be difficult for a receiver to detect signals transmitted through the channels with severe ISI.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Some example embodiments described herein generally relate to clock recovery and equalization implementations in multi-channel receivers.

In an example embodiment, a method of performing clock recovery and equalizer coefficient estimation in a multi-channel receiver is described. The method may include recovering, at a first clock recovery unit, a first clock signal associated with a first channel. The method may also include estimating a first set of coefficients for a first equalizer associated with the first channel using the first clock signal. The method may also include passing the first clock signal from the first clock recovery unit to a second clock recovery unit associated with a second channel. The method may also include recovering, at the second clock recovery unit, a second clock signal associated with the second channel using the first clock signal as a reference clock signal to the second clock recovery unit. The method may also include passing the first set of coefficients as initialization coefficients to a second equalizer associated with the second channel. The method may also include estimating a second set of coefficients for the second equalizer using the initialization coefficients.

In another example embodiment, a multi-channel receiver is described. The receiver may include a first clock recovery unit, a first coefficient estimation unit, a second clock recovery unit, and a second coefficient estimation unit. The first clock recovery unit may be configured to recover a first clock signal associated with a first channel. The first clock recovery unit may be configured to pass the first clock signal to a second clock recovery unit associated with a second channel. The first coefficient estimation unit may be configured to estimate a first set of coefficients for a first equalizer associated with the first channel using the first clock signal. The first coefficient estimation unit may be configured to pass the first set of coefficients to a second coefficient estimation unit. The second clock recovery unit may be configured to recover a second clock signal associated with the second channel using the first clock signal as a reference clock signal to the second clock recovery unit. The second coefficient estimation unit may be configured to estimate a second set of coefficients for a second equalizer associated with the second channel using the first set of coefficients as initialization coefficients for the second equalizer.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 6 is a block diagram that illustrates an example computing device that is arranged for implementing digital signal processing techniques in a data communication system.

DETAILED DESCRIPTION OF SOME EXAMPLE EMBODIMENTS

Figure 1A:
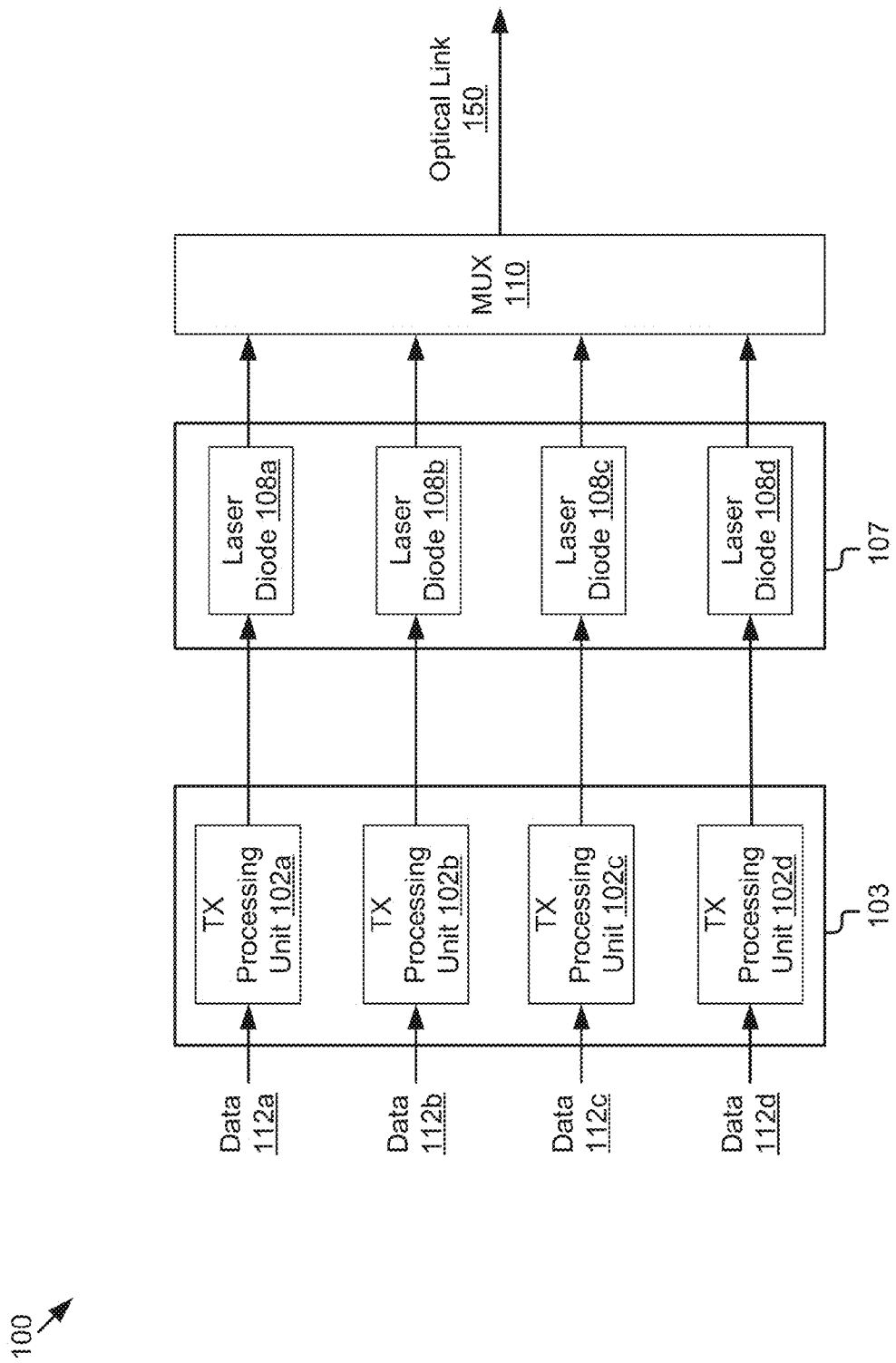
FIG. 1A is a block diagram of an example multi-channel transmitter.

Embodiments described herein generally relate to clock recovery and equalization implementations in multi-channel receivers.

Some embodiments described herein may utilize dependence (or correlation) between neighbor channels on a multi-mode fiber (MMF) link for reliable clock recovery and equalizer convergence at a wavelength division multiplexing (WDM) receiver. The MMF link may be optimized for performance at a wavelength of a first channel (e.g., 850 nanometers (nm)). Accordingly, compared to other channels with other wavelengths (e.g., 880 nm, 910 nm, 940 nm), the MMF link may have a widest effective bandwidth at the wavelength of the first channel (e.g., 850 nm).

Initially, a receiver of the MMF link may recover a first clock signal associated with the first channel and may estimate first coefficients for a first equalizer associated with the first channel. Next, the receiver may use the first clock signal as a reference clock signal to recover a second clock signal associated with a second channel (e.g., 880 nm). The receiver may also use the first coefficients to aid in estimating second coefficients for a second equalizer associated with the second channel. The receiver may use the second clock signal as a reference clock signal to recover a third clock signal associated with a third channel (e.g., 910 nm). The receiver may also use the second coefficients to aid in estimating third coefficients for a third equalizer associated with the third channel (e.g., 910 nm). Similarly, the receiver may perform similar operations to recover clock signals and to estimate coefficients for equalizers associated with any other channels of the MMF link. As a result, reliable clock recovery and equalizer convergence may be achieved for all WDM channels, including those with severe inter-symbol interference (ISI).

In some embodiments, the receiver may include: a demultiplexer (DEMUX) that may be configured to receive a laser beam from an optical link, where the optical link may be optimized for a particular wavelength and the laser beam may include one or more optical carrier signals associated with other wavelengths; a first clock recovery unit configured to receive a first optical carrier signal of the optical carrier signals from the DEMUX and to recover a first clock signal from the first optical carrier signal; and a second clock recovery unit configured to receive a second optical carrier signal of the optical carrier signals from the DEMUX, to receive a reference clock signal from the first clock recover unit, and to recover a second clock signal using the reference clock signal. The first optical carrier signal may be associated with a first wavelength. The second optical carrier signal may be associated with a second wavelength. The first wavelength may be between the second wavelength and the particular wavelength. The reference clock signal may be the first clock signal. The receiver may further include a first coefficient estimation unit configured to: estimate a first set of coefficients for a first equalizer associated with the first channel using the first clock signal; and pass the first set of coefficients as initialization coefficients to a second equalizer associated with the second clock recovery unit.

Technologies described herein may be generalized for a receiver with any number of WDM channels. As a channel density in the receiver increases, similarity of fiber channel responses of neighbor channels may also increase. Thus, performance of the technologies described herein may be improved at the receiver.

The technologies described herein may be implemented in communication modules that may communicate data at a data rate of 40 Giga bits per second (Gb/s), 100 Gb/s, and/or another suitable data rate in MMF WDM applications. The technologies may provide a sub-system with improved clock recovery and equalizer convergence, which may enable a longer reach of the optical link and/or a more reliable operation at the receiver. The technologies described herein may also be applicable to single mode fiber (SMF) systems. For example, some data center optical modules may operate near a zero dispersion wavelength of about 1310 nm and may use WDM. Some of these WDM channels may experience a worst case chromatic dispersion, while some other channels near the zero dispersion wavelength may experience a lower dispersion.

The technologies described herein may include a system that may include a non-return-to-zero (NRZ) transmitter and a NRZ receiver, with an analog feed-forward equalization decision feedback equalization (FFE-DFE) equalizer at the receiver. A more complex system with a digital-to-analog converter (DAC), an analog-to-digital converter (ADC), and various advanced modulation techniques may also be applied herein.

Reference will now be made to the drawings to describe various aspects of some example embodiments of the invention. The drawings are diagrammatic and schematic representations of such example embodiments, and are not limiting of the present invention, nor are they necessarily drawn to scale.

FIG. 1A is a block diagram of an example structure of a multi-channel transmitter (transmitter) 100, arranged in accordance with at least some embodiments described herein. The transmitter 100 may be configured to transmit data (e.g., streams of data 112a-112d discussed herein) to a multi-channel receiver through an optical link 150. The optical link 150 may include an MMF fiber such as OM3, OM4, or any other suitable fiber (e.g., an SMF fiber).

The transmitter 100 may include: a transmitter (TX) processing module 103 that includes one or more TX processing units 102a-102d (also referred to individually or collectively as TX processing unit 102 or TX processing units 102); a laser array 107 that includes one or more laser diodes 108a-108d (also referred to individually or collectively as laser diode 108 or laser diodes 108); a multiplexer (MUX) 110; one or more other suitable transmitter components; or combinations thereof.

Although the transmitter 100 is illustrated as a 4-channel transmitter in FIG. 1A, the transmitter 100 may include more than 4 channels or fewer than 4 channels. In some embodiments, the transmitter 100 may additionally include receiving components that enable the transmitter 100 to act as a transceiver for conducting bi-directional communications through one or more optical links (e.g., the optical link 150).

In some embodiments, one or more of the TX processing units 102 may include a TX digital signal processing (DSP) unit. For example, the TX processing unit 102 may include a discrete multi-tone (DMT) TX DSP unit or an orthogonal frequency division multiplexing (OFDM) TX DSP unit.

In the depicted embodiment, each of the TX processing units 102 may receive a respective stream of data 112a-112d (e.g., a respective stream of digital data bits), hereinafter "stream of data 112" or "streams of data 112," and may process the respective stream of data 112 to output a respective signal in a form suitable for driving a laser diode. For example, the TX processing unit 102a may receive a stream of data 112a, and apply a NRZ modulation technique for direct modulation of the laser diode 108a. Similarly, the TX processing unit 102b may receive a stream of data 112b, and apply a NRZ modulation technique for direct modulation of the laser diode 108b. The TX processing unit 102c may receive a stream of data 112c, and apply a NRZ modulation technique for direct modulation of the laser diode 108c. The TX processing unit 102d may receive a stream of data 112d, and apply a NRZ modulation technique for direct modulation of the laser diode 108d.

Example modulation techniques may include, but are not limited to, a quadrature amplitude modulation (QAM) technique, a phase-shift keying (PSK) technique, a frequency-shift keying (FSK) technique, an amplitude-shift keying (ASK) technique, non-return-to-zero (NRZ) line coding, pulse-amplitude modulation (PAM), and any other suitable modulation techniques.

A corresponding laser diode 108 may receive a corresponding signal and may emit an optical carrier signal with a particular wavelength according to the corresponding signal. The laser diode 108 may include a vertical-cavity surface-emitting laser (VCSEL), a distributed feedback (DFB) laser, or another suitable laser.

In some embodiments, each of the laser diodes 108 in the laser array 107 may be configured to emit an optical carrier signal with a different wavelength. For example, the laser diode 108a may emit an optical carrier signal with a wavelength $\lambda_1$. Similarly, the laser diode 108b may emit an optical carrier signal with a wavelength $\lambda_2$. The laser diode 108c may emit an optical carrier signal with a wavelength $\lambda_3$. The laser diode 108d may emit an optical carrier signal with a wavelength $\lambda_4$. Wavelengths $\lambda_1$, $\lambda_2$, $\lambda_3$, and $\lambda_4$ of the optical carrier signals may be in a wavelength range between 780 nm and 1000 nm or in another suitable wavelength range. Each two adjacent wavelengths $\lambda_1$, $\lambda_2$, $\lambda_3$, and $\lambda_4$ may be spaced with a distance between about 15 nm and about 60 nm or another suitable spacing distance (e.g., 15 nm $15_2$-$\lambda_1 \leq 60$ nm, 15 nm $su_3$-$\lambda_2 \leq 60$ nm, 15 nm$\leq\lambda_4$-$\lambda_3 \leq 60$ nm).

The MUX 110 may multiplex the optical carrier signals that are output from the laser array 107 onto the optical link 150 for transmission to a receiver (not shown in FIG. 1A). The MUX 110 may include a WDM multiplexer.

Figure 1B:
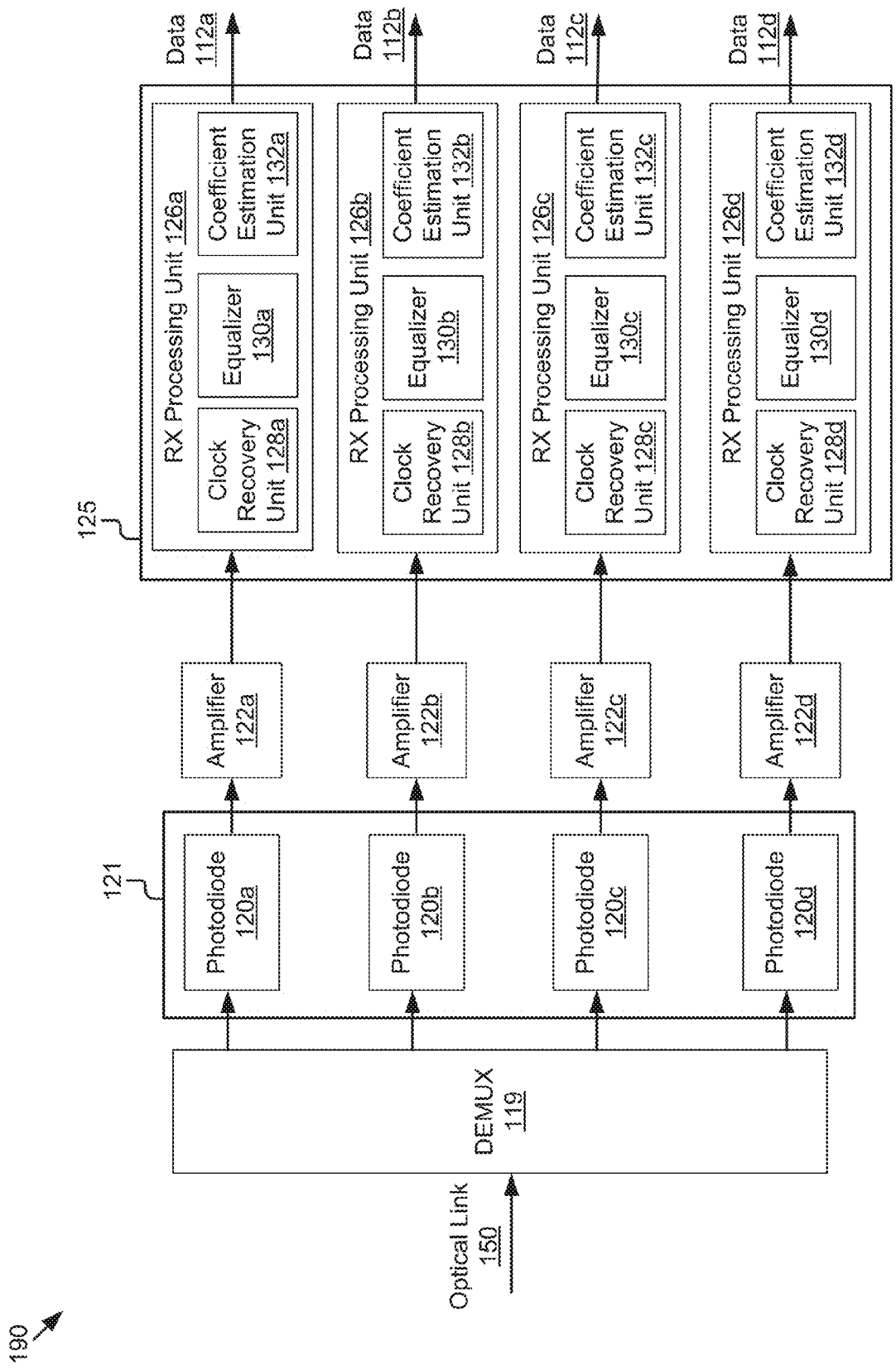
FIG. 1B is a block diagram of an example multi-channel receiver.

FIG. 1B is a block diagram of an example structure of a multi-channel receiver (receiver) 190, arranged in accordance with at least some embodiments described herein. The receiver 190 may include: a DEMUX 119; a photodiode array 121 that includes one or more photodiodes 120a-120d (also referred to individually or collectively as photodiode 120 or photodiodes 120); one or more amplifiers 122a-122d (also referred to individually or collectively as amplifier 122 or amplifiers 122); a receiver (RX) processing module 125 that includes one or more RX processing units 126a-126d (also referred to individually or collectively as RX processing unit 126 or RX processing units 126); one or more other suitable receiver components; or combinations thereof.

Although the receiver 190 is illustrated as a 4-channel receiver in FIG. 1B, the receiver 190 may include more than 4 channels or fewer than 4 channels. In some embodiments, the receiver 190 may additionally include transmitting components that enable the receiver 190 to act as a transceiver for conducting bi-directional communications through one or more optical links (e.g., the optical link 150).

In some embodiments, the DEMUX 119 may include a WDM demultiplexer. The DEMUX 119 may receive a laser beam from the optical link 150. The laser beam may include multiple optical carrier signals with different wavelengths. The optical carriers may be corrupted by noise, loss, ISI, and/or distortion as the laser beam propagates through the optical link 150.

The DEMUX 119 may split the laser beam into separate optical carrier signals according to the different wavelengths of the optical carrier signals, and may output the separate optical carrier signals to the photodiodes 120 in the photodiode array 121. For example, the DEMUX 119 may output an optical carrier signal with a wavelength $\lambda_1$ to the photodiode 120a, an optical carrier signal with a wavelength $\lambda_2$ to the photodiode 120b, an optical carrier signal with a wavelength $\lambda_3$ to the photodiode 120c, and an optical carrier signal with a wavelength $\lambda_4$ to the photodiode 120d.

The photodiodes 120 may convert the optical carrier signals received from the DEMUX 119 into analog signals. The amplifiers 122 may amplify the analog signals received from the photodiodes 120. One or more of the amplifiers 122 may include a transimpedance amplifier (TIA) or other amplifier circuitry. The RX processing units 126 may process the corresponding signals to output streams of data 112.

Each of the RX processing units 126 may be associated with a channel and may process signals transmitted through the channel. As used herein, a channel that is used to transmit an optical carrier signal with a wavelength $\lambda$ may be referred to as a channel with the wavelength $\lambda$ or as a channel $\lambda$. The RX processing unit 126a may process signals transmitted through a channel with a wavelength $\lambda_1$. Similarly, the RX processing unit 126b may process signals transmitted through a channel with a wavelength $\lambda_2$. The RX processing unit 126c may process signals transmitted through a channel with a wavelength $\lambda_3$. The RX processing unit 126d may process signals transmitted through a channel with a wavelength $\lambda_4$. The channels $\lambda_1$-$\lambda_4$ may be different channels on the optical link 150.

The RX processing unit 126a may include a clock recovery unit 128a, an equalizer 130a, a coefficient estimation unit 132a, and one or more other suitable components. Similarly, the RX processing unit 126b may include a clock recovery unit 128b, an equalizer 130b, a coefficient estimation unit 132b, and one or more other suitable components. The RX processing unit 126c may include a clock recovery unit 128c, an equalizer 130c, a coefficient estimation unit 132c, and one or more other suitable components. The RX processing unit 126d may include a clock recovery unit 128d, an equalizer 130d, a coefficient estimation unit 132d, and one or more other suitable components.

The clock recovery units 128a-128d may be referred to individually or collectively as clock recovery unit 128 or clock recovery units 128. The equalizers 130a-130d may be referred to individually or collectively as equalizer 130 or equalizers 130. The coefficient estimation units 132a-132d may be referred to individually or collectively as coefficient estimation unit 132 or coefficient estimation units 132. In some embodiments, the coefficient estimation unit 132 may be integrated into the equalizer 130. In some embodiments, the clock recovery unit 128 may include a phase-locked loop and any other circuitry components.

The clock recovery unit 128 of one of the RX processing units 126 may be configured to recover a clock signal associated with a particular channel. For instance, the clock recovery unit 128a may be configured to recover the clock signal associated the channel $\lambda_1$. In some embodiments, the clock recovery unit 128 may recover the clock signal for the particular channel using another clock signal recovered for another channel as a reference clock signal. For example, clock recovery unit 128b may be configured to recover the clock signal for the channel $\lambda_2$ using the clock signal associated with the channel $\lambda_1$.

The clock recovery unit 128 may forward the clock signal, which is recovered and/or based on a reference clock signal, to the equalizer 130 of the RX processing unit 126. The equalizer 130 may use the clock signal to perform equalization operations. The equalization operations may be based on a set of coefficients.

The coefficient estimation unit 132 of the RX processing unit 126 may be configured to estimate the set of coefficients for the equalizer 130 from the RX processing unit 126. For example, the coefficient estimation unit 132a may estimate the set of coefficients for the equalizer 130a from the RX processing unit 126a.

In some embodiments, the coefficient estimation unit 132 may use another set of coefficients estimated for another equalizer 130 as initialization coefficients to estimate the set of coefficients. The initialization coefficients may be used to initialize the set of coefficients at the beginning of a coefficient estimation process. For example, the coefficient estimation unit 132b may use a set of coefficients estimated for the equalizer 130b as initialization coefficients. The initialization coefficients may be used to initialize the set of coefficients in the coefficient estimation unit 132b.

The coefficient estimation unit 132 may configure the equalizer 130 with the set of coefficients so that the equalizer 130 may equalize signals transmitted through the particular channel. Equalization of the signals transmitted through the particular channel may at least partially compensate ISI and/or other distortion caused by signal propagation.

Example equalization schemes applied in the equalizer 130 may include, but are not limited to, a feed-forward equalization (FFE) scheme, a decision feedback equalization (DFE) scheme, a decision directed least mean square (DD-LMS) scheme, any other suitable equalization scheme, and/or some combination thereof.

Figure 2:
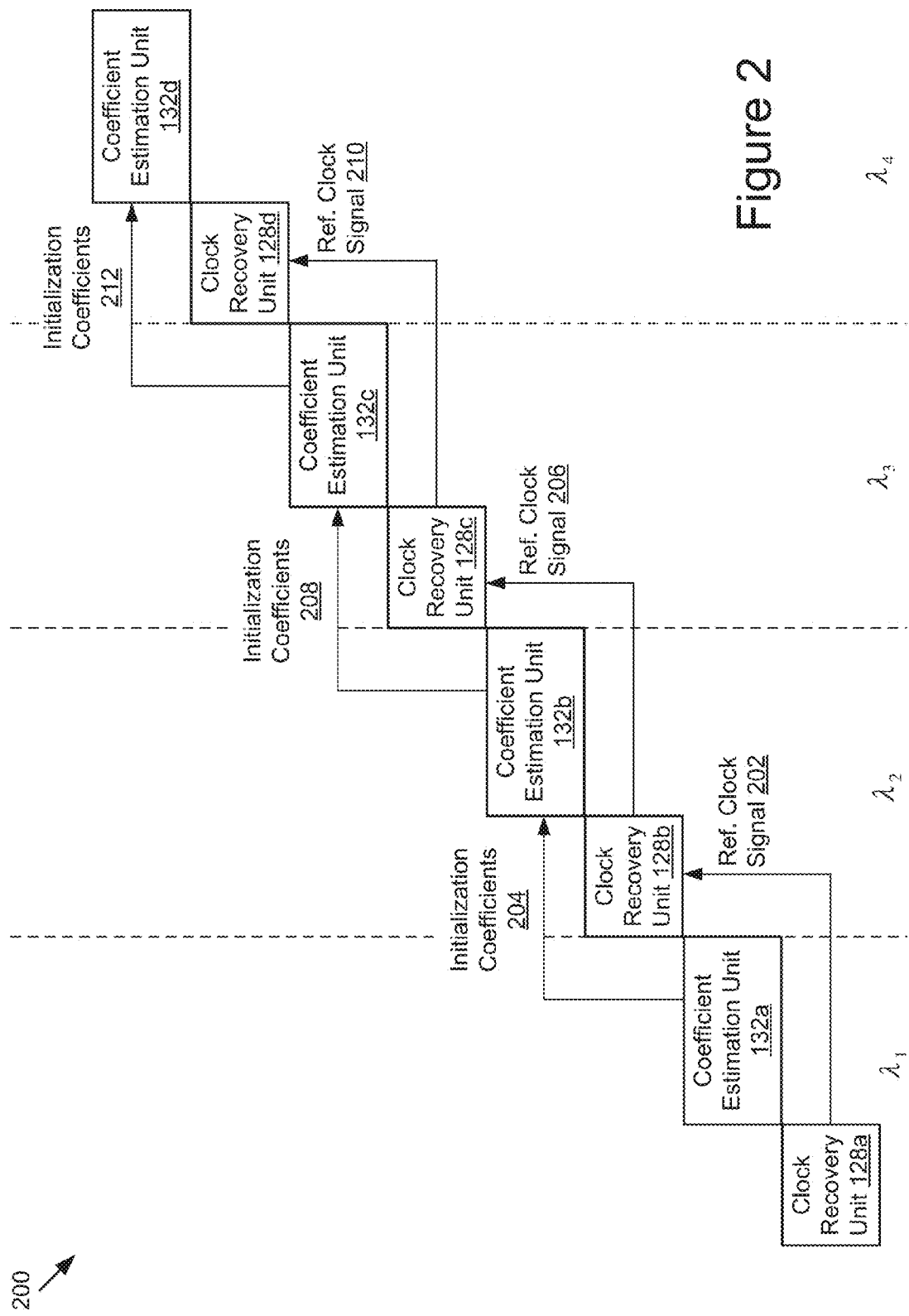
FIG. 2 is a block diagram of an example process of performing clock recovery and equalizer coefficient estimation in the multi-channel receiver of FIG. 1B.

With combined reference to FIGS. 1B and 2, an example process 200 of performing clock recovery and equalizer coefficient estimation in the multi-channel receiver 190 of FIG. 1B is described. The receiver 190 may be a 4-channel receiver with a first channel $\lambda_1$ (e.g., $\lambda_1$=850 nm or another wavelength), a second channel $\lambda_2$ (e.g., $\lambda_2$=880 nm or another wavelength), a third channel $\lambda_3$ (e.g., $\lambda_3$=910 nm or another wavelength), and a fourth channel $\lambda_4$ (e.g., $\lambda_4$=940 nm or another wavelength).

In some embodiments, the performance of the optical link 150 may be optimized for the first channel $\lambda_1$ so that the first channel $\lambda_1$ may have a smaller ISI than the other channels $\lambda_2$, $\lambda_3$, and $\lambda_4$. For example, an OM3 link or an OM4 link may be optimized for data transmission through the first channel $\lambda_1$ with $\lambda_4$=850 nm, with a widest effective bandwidth at $\lambda_1$=850 nm when compared to other channels $\lambda_2$=880 nm, $\lambda_3$=910 nm, and $\lambda_4$=940 nm.

Initially, the clock recovery unit 128a of the RX processing unit 126a associated with the first channel $\lambda_1$ may recover a first clock signal associated with the first channel $\lambda_1$. The coefficient estimation unit 132a of the RX processing unit 126a may estimate a first set of coefficients for the equalizer 130a of the RX processing unit 126a using the recovered first clock signal. For example, when the clock recovery unit 128a is locked (e.g., an output from the clock recovery unit 128a is locked to the first clock signal), the coefficient estimation unit 132a and the equalizer 130a may cooperate with each other to run a DD-LMS technique or another suitable technique to learn the first set of coefficients optimized for the equalizer 130a. The first channel $\lambda_1$ may be associated with an eye diagram with an open eye so that reliable clock recovery and equalization convergence may be achieved in the RX processing unit 126a.

Next, the clock recovery unit 128a may pass the first clock signal as a reference clock signal 202 to the clock recovery unit 128b of the RX processing unit 126b associated with the second channel $\lambda_2$. In some embodiments, the second channel $\lambda_2$ may be a neighbor channel of the first channel $\lambda_1$. A first channel response of the first channel $\lambda_1$ may be similar to or related to a second channel response of the second channel $\lambda_2$. For example, a channel transfer function of the first channel $\lambda_1$ may be similar to or related to a channel transfer function of the second channel $\lambda_2$. As a result, the first clock signal and the first set of coefficients associated with the first channel $\lambda_1$ may be used to aid in recovery of a second clock signal and estimation of a second set of coefficients associated with the second channel $\lambda_2$.

The clock recovery unit 128b may use the reference clock signal 202 from the clock recovery unit 128a to recover the second clock signal associated with the second channel $\lambda_2$. When the clock recovery unit 128b is locked (e.g., an output from the clock recovery unit 128b is locked to the second clock signal), the coefficient estimation unit 132a may pass the first set of coefficients as initialization coefficients 204 to the coefficient estimation unit 132b of the RX processing unit 126b. The coefficient estimation unit 132b may estimate the second set of coefficients for the equalizer 130b of the RX processing unit 126b using the recovered second clock signal and the initialization coefficients 204. For example, the coefficient estimation unit 132b may initialize the second set of coefficients using the initialization coefficients 204 to aid in convergence of the estimation of the second set of coefficients. The coefficient estimation unit 132b and the equalizer 130b may cooperate with each other to run a DD-LMS technique or another equalization technique to learn the second set of coefficients optimized for the equalizer 130b.

Next, the clock recovery unit 128b may pass the second clock signal as a reference clock signal 206 to the clock recovery unit 128c of the RX processing unit 126c associated with the third channel $\lambda_3$. In some embodiments, the third channel $\lambda_3$ may be a neighbor channel of the second channel $\lambda_2$. The second channel response of the second channel $\lambda_2$ may be similar to or related to a third channel response of the third channel $\lambda_3$. As a result, the second clock signal and the second set of coefficients associated with the second channel $\lambda_2$ may be used to aid in recovery of a third clock signal and estimation of a third set of coefficients associated with the third channel $\lambda_3$.

The clock recovery unit 128c may use the reference clock signal 206 from the clock recovery unit 128b to recover the third clock signal associated with the third channel $\lambda_3$. When the clock recovery unit 128c is locked, the coefficient estimation unit 132b may pass the second set of coefficients as initialization coefficients 208 to the coefficient estimation unit 132c of the RX processing unit 126c. The coefficient estimation unit 132c may estimate the third set of coefficients for the equalizer 130c of the RX processing unit 126c using the recovered third clock signal and the initialization coefficients 208. For example, the coefficient estimation unit 132c may initialize the third set of coefficients with the initialization coefficients 208 to aid in convergence of the estimation of the third set of coefficients. The coefficient estimation unit 132c and the equalizer 130c may cooperate with each other to run a DD-LMS technique or another equalization technique to learn the third set of coefficients optimized for the equalizer 130c.

Next, the clock recovery unit 128c may pass the third clock signal as a reference clock signal 210 to the clock recovery unit 128d of the RX processing unit 126d associated with the fourth channel $\lambda_4$. In some embodiments, the fourth channel $\lambda_4$ may be a neighbor channel of the third channel $\lambda_3$. The third channel response of the third channel $\lambda_3$ may be similar to or related to a fourth channel response of the fourth channel $\lambda_4$. As a result, the third clock signal and the third set of coefficients associated with the third channel $\lambda_3$ may be used to aid in recovery of a fourth clock signal and estimation of a fourth set of coefficients associated with the fourth channel $\lambda_4$.

The clock recovery unit $128d$ may use the reference clock signal 210 from the clock recovery unit $128c$ to recover the fourth clock signal associated with the fourth channel $\lambda_4$. When the clock recovery unit $128d$ is locked, the coefficient estimation unit $132c$ may pass the third set of coefficients as initialization coefficients 212 to the coefficient estimation unit $132d$ of the RX processing unit $126d$. The coefficient estimation unit $132d$ may estimate the fourth set of coefficients for the equalizer $130d$ of the RX processing unit $126d$ using the recovered fourth clock signal and the initialization coefficients 212.

FIGS. 1B and 2 depict a 4-channel receiver 190 and 4 channels $\lambda_1$-$\lambda_4$. In some embodiments, the process 200 may be applied in a multi-channel receiver having more than four channels and associated with more than four WDM channels. Additionally, the process 200 may be applied in a multi-channel receiver having fewer than four channels and associated with fewer than four WDM channels.

Figure 3:
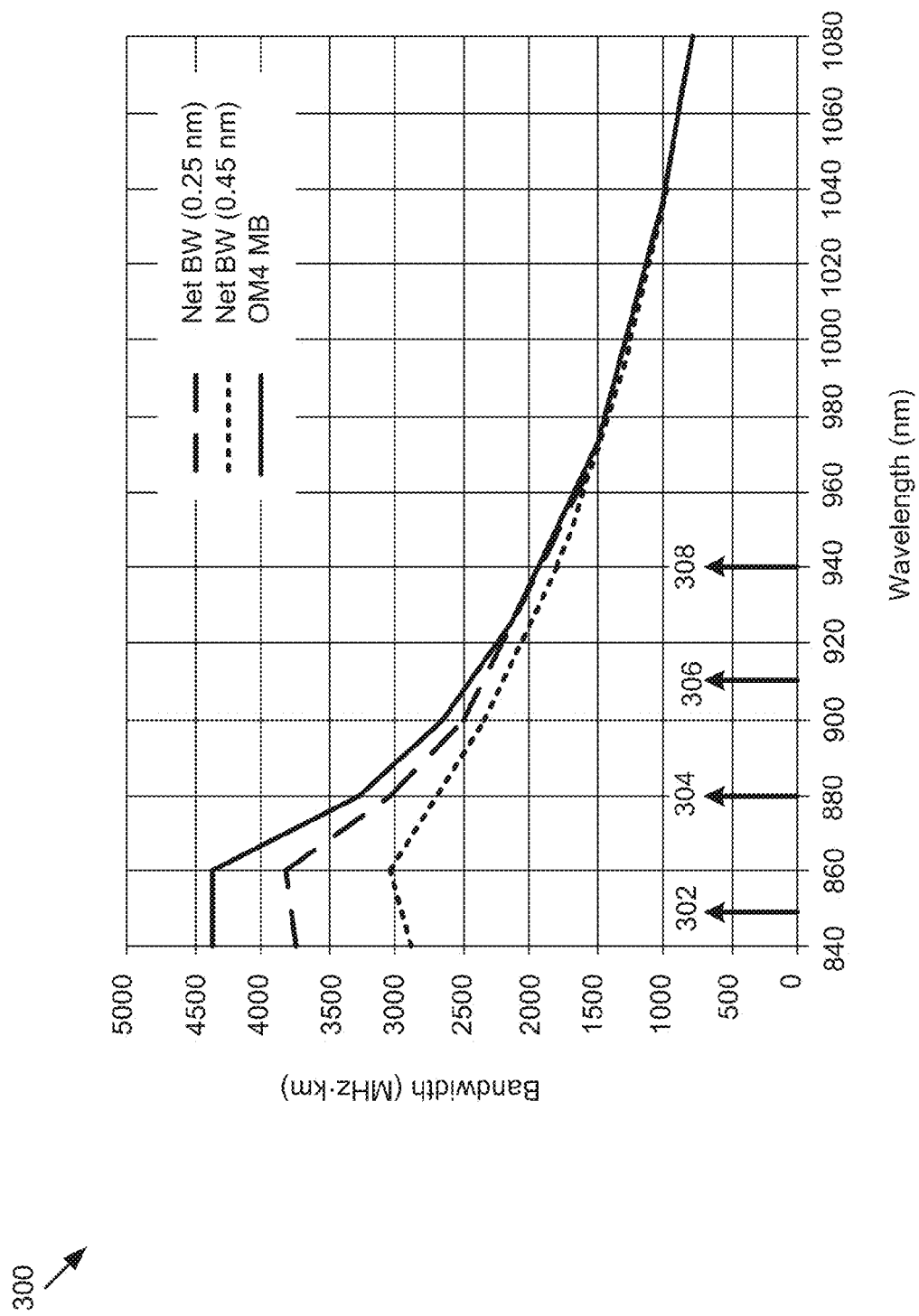
FIG. 3 includes a graphic representation of example bandwidth-wavelength dependence on an optical link.

FIG. 3 includes a graphic representation 300 that illustrates example bandwidth-wavelength dependence on an example MMF link (e.g., an OM3 or OM4 link), arranged in accordance with at least some embodiments described herein. FIG. 3 illustrates a worst case of fiber bandwidth-wavelength dependence. For example, FIG. 3 shows a statistical model for the wavelength dependence of the worst case OM4 fiber bandwidth. The solid curve shows only modal bandwidth, while the other two curves show the net bandwidth after including chromatic dispersion.

The bandwidth-wavelength dependence may indicate that an effective bandwidth for a channel on the MMF link may depend on a wavelength associated with the channel. Four wavelengths (e.g., $\lambda_1$=850 nm, $\lambda_2$=880 nm, $\lambda_3$=910 nm, and $\lambda_4$=940 nm) are illustrated with arrows 302, 304, 306, and 308, respectively. Compared to the wavelengths $\lambda_2$=880 nm, $\lambda_3$=910 nm, and $\lambda_4$=940 nm, the MMF link is optimized for best performance near the wavelength $\lambda_1$=850 nm. For example, the MMF fiber (e.g., an OM3 or OM4 fiber) may have a widest fiber bandwidth near the wavelength $\lambda_4$=850 nm when compared to the wavelengths $\lambda_2$=880 nm, $\lambda_3$=910 nm, and $\lambda_4$=940 nm.

Figure 4:
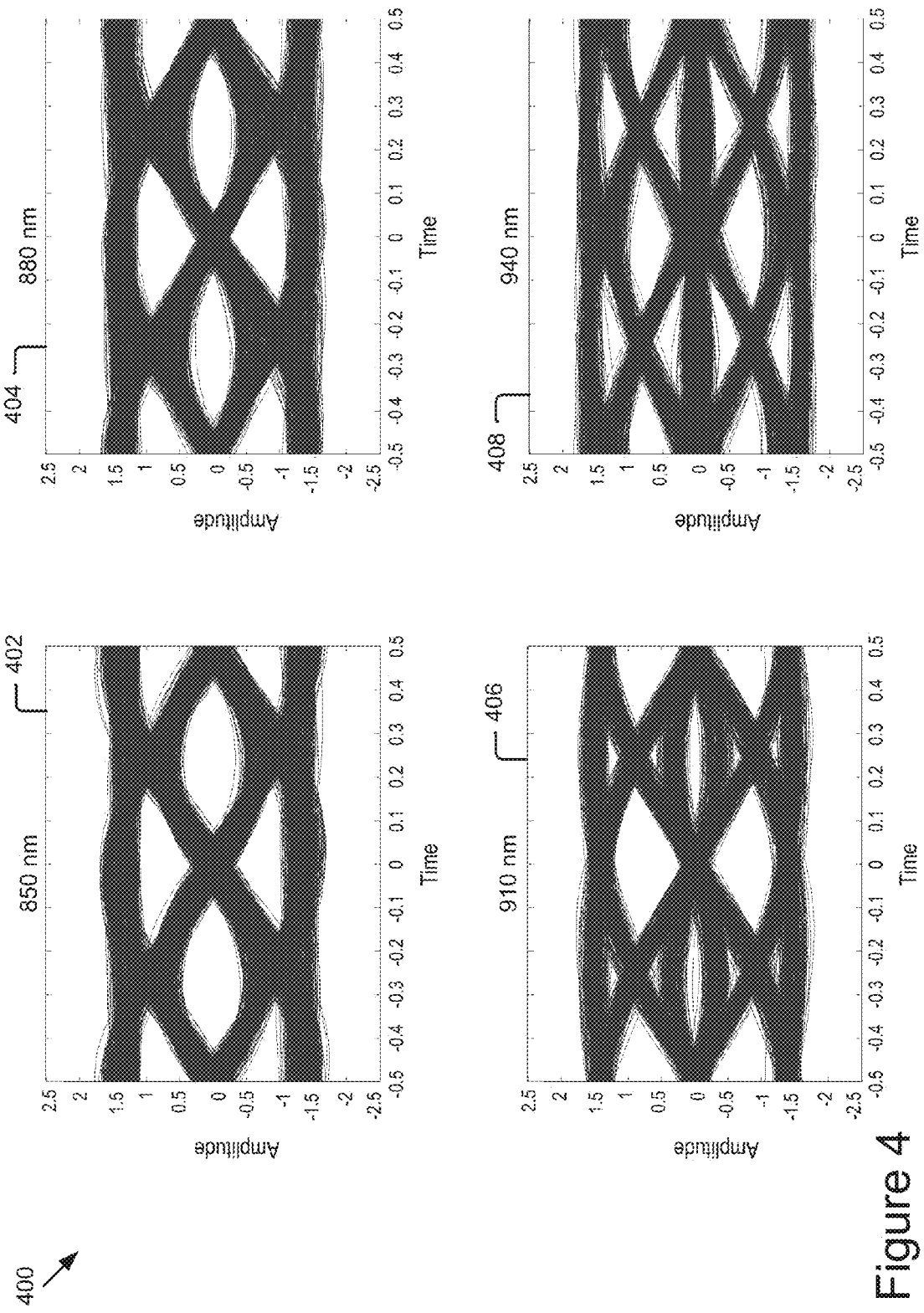
FIG. 4 includes graphic representations of example eye diagrams associated with different wavelengths on an optical link.

FIG. 4 includes graphic representations 400 that illustrate example eye diagrams 402, 404, 406, and 408 associated with different wavelengths on an MMF optical link, arranged in accordance with at least some embodiments described herein. Since an effective bandwidth on an MMF optical link may depend on a wavelength of a channel as illustrated in FIG. 3, eye openings of eye diagrams may vary across different channels associated with different wavelengths. The eye diagrams 402, 404, 406, and 408 are simulated with a data rate of 25 Gb/s for a 300-meter OM4 link, and may correspond to worst case fiber bandwidths for wavelengths 850 nm, 880 nm, 910 nm, and 940 nm, respectively.

A channel with the wavelength 850 nm is associated with the eye diagram 402, with a widest eye opening compared to the eye diagrams 404, 406, and 408. Reliable clock recovery and equalizer coefficient convergence may be achieved with high confidence for the channel with the wavelength 850 nm even if the channel has the worst case fiber bandwidth. A channel with the wavelength 940 nm is associated with the eye diagram 408 with closed eyes in the worst case. Signals transmitted through the channel with the wavelength 940 nm may be severely degraded, and clock recovery and equalization performed for the channel with the wavelength 940 nm may not be reliable. However, the receiver may exploit similarity or correlation between neighbor channels (or adjacent channels) to provide a reliable clock recovery and equalizer convergence for all the WDM channels. For example, the receiver may perform a process identical or similar to the process 200 of FIG. 2 for reliable clock recovery and equalizer coefficient estimation for all the channels, beginning with the channel (here with a wavelength of 850 nm) having the widest eye opening and thus reliable clock and recovery equalizer coefficient convergence.

Figure 5:
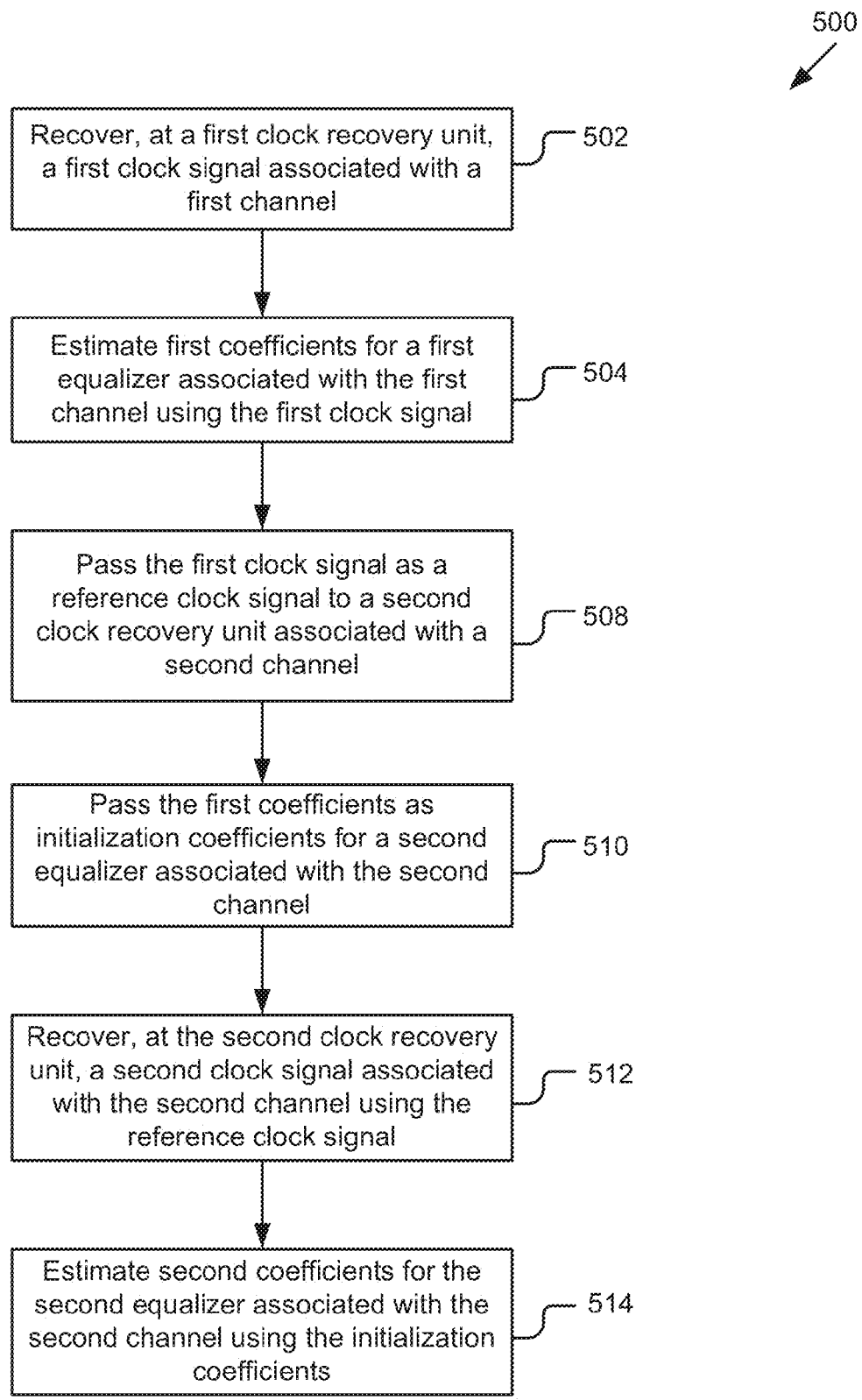
FIG. 5 shows an example flow diagram of a method of performing clock recovery and equalizer coefficient estimation in a multi-channel receiver.

FIG. 5 shows an example flow diagram of a method 500 of performing clock recovery and equalizer coefficient estimation in a multi-channel receiver, arranged in accordance with at least some embodiments described herein. The method 500 may be performed in whole or in part by a receiver (e.g., the receiver 190 of FIG. 1B). Although illustrated as discrete blocks, various blocks may be divided into additional blocks, combined into fewer blocks, or eliminated, depending on the desired implementation.

The method 500 may begin at block 502 in which a first clock signal associated with a first channel may be recovered at a first clock recovery unit of the receiver.

At block 504, first coefficients for a first equalizer associated with the first channel may be estimated using the first clock signal.

At block 508, the first clock signal may be passed, as a reference clock signal, to a second clock recovery unit associated with a second channel.

At block 510, the first coefficients may be passed as initialization coefficients for a second equalizer associated with the second channel.

At block 512, a second clock signal associated with the second channel may be recovered at the second clock recovery unit using the reference clock signal.

At block 514, second coefficients for the second equalizer associated with the second channel may be estimated using the initialization coefficients and the second clock signal recovered for the second channel.

In some embodiments, the estimation of the second set of coefficients for the second equalizer includes one or more additional operations. For example, in these and other embodiments, the estimation of the second set of coefficients may include initializing the second set of coefficients using the first initialization coefficients. Additionally or alternatively, the estimation of the second set of coefficients may include estimating the second set of coefficients using an equalization scheme after the initialization. The equalization scheme may include a FFE scheme, a DFE scheme, a DD-LMS scheme, another suitable equalization scheme, or some combination thereof.

In some embodiments, the first channel has a first channel response that is related to a second channel response of the second channel. Additionally or alternatively, the first channel may be associated with a wavelength for which an optical link, such as an MMF link, is optimized. Accordingly, the first channel may include a smaller ISI than the second channel. Additionally, in some embodiments, the first channel and the second channel are associated with a first wavelength and a second wavelength respectively that are within a range between about 800 nm and about 1000 nm. In these and other embodiments, a channel spacing between the first channel and the second channel may be within a range between about 15 nm and about 60 nm.

In some embodiments, the method 500 may continue performing operations similar to blocks 508, 510, 512, and 514 to recover clocks signals and to estimate coefficients for a third channel, a fourth channel, and/or any other numbers of channels. For example, the method 500 may additionally include passing the second clock signal as a reference clock signal to a third clock recovery unit associated with a third channel and recovering, at the third clock recovery unit, a third clock signal associated with the third channel using the reference clock signal. The method 500 may also include passing the second coefficients as initialization coefficients for a third equalizer associated with the third channel. The method 500 may also include estimating third coefficients for the third equalizer using the second coefficients as the initialization coefficients.

In these and other embodiments, the second channel may be a neighbor channel of the first channel, the third channel may be a neighbor channel of the second channel, and the fourth channel may be a neighbor channel of the third channel. Additionally or alternatively, the first channel may be associated with a wavelength of 850 nm, the second channel is associated with a wavelength of 880 nm, the third channel may be associated with a wavelength of 910 nm, and the fourth channel is associated with a wavelength of 940 nm.

In some embodiments, the first channel is associated with a wavelength for which an optical link has been optimized. The first channel may accordingly have a smaller ISI than the second channel. In addition, the second channel may have a smaller ISI than the third channel, and the third channel may have a smaller ISI than the fourth channel.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, implemented with additional steps and operations, or expanded into additional steps and operations without detracting from the essence of the disclosed embodiments.

Some embodiments disclosed herein include an article of manufacture such as a non-transitory computer storage medium having instructions stored thereon that are executable by a computing device to perform or control performance of operations included in the method 500 of FIG. 5, such as the operations illustrated by blocks 502, 504, 508, 510, 512, and/or 514 in FIG. 5, and/or variations thereof. The non-transitory computer storage medium may be included in or may be accessible to a computing device such as the computing device 600 of FIG. 6 or a DSP unit that includes a processor and a memory. In some embodiments, the non-transitory computer storage medium may be included in or may be accessible to the receiver (e.g., the receiver 190 of FIG. 1B).

FIG. 6 is a block diagram that illustrates an example computing device 600 that is arranged for implementing digital signal processing techniques in a data communication system, arranged in accordance with at least some embodiments described herein. For example, for digital signal processing techniques may include clock recovery and equalizer estimation processes described herein. The computing device 600 or one or more components thereof may be included in the receiver 190 of FIG. 1B.

In a very basic configuration 602, the computing device 600 may typically include one or more processors 604 and a system memory 606. A memory bus 608 may be used for communicating between the processor 604 and the system memory 606.

Depending on the desired configuration, the processor 604 may be of any type including, but not limited to, a CPU, a μP, a μC, a DSP, or any combination thereof. The processor 604 may include one or more levels of caching, such as a level one cache 610 and a level two cache 612, a processor core 614, and registers 616. The example processor core 614 may include an arithmetic logic unit (ALU), a floating point unit (FPU), a digital signal processing core (DSP core), or any combination thereof. An example memory controller 618 may also be used with the processor 604, or in some implementations the memory controller 618 may be an internal part of the processor 604.

Depending on the desired configuration, the system memory 606 may be of any type including, but not limited to, volatile memory (such as RAM), non-volatile memory (such as ROM, flash memory), or any combination thereof. The system memory 606 may include an operating system (OS) 620, one or more applications 622, and program data 624. The application 622 may include digital signal processing (DSP) algorithms 626, or other application that may be arranged to perform one or more of the functions as described herein including those described with respect to the method 500 of FIG. 5. The program data 624 may include DSP data 628 that may be pulled into the application 622 for analysis. In some embodiments, the application 622 may be arranged to operate with the program data 624 on the OS 620 such that implementations of a method for clock recovery and equalizer coefficient estimation such as the method 500 of FIG. 5, may be provided as described herein.

The computing device 600 may have additional features or functionality, and additional interfaces to facilitate communications between the basic configuration 602 and any required devices and interfaces. For example, a bus/interface controller 630 may be used to facilitate communications between the basic configuration 602 and one or more data storage devices 632 via a storage interface bus 634. The data storage devices 632 may be removable storage devices 636, non-removable storage devices 638, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer-readable instructions, data structures, program modules, or other data.

The system memory 606, removable storage devices 636, and non-removable storage devices 638 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (e.g., output devices 642, peripheral interfaces 644, and communication devices 646) to the basic configuration 602 via the bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device) or other peripheral devices (e.g., printer, scanner) via one or more I/O ports 658. The example communication device 646 may include a network controller 660, which may be arranged to facilitate communications with one or more other computing devices 662 over a network communication link via one or more communication ports 664.

The network communication link may be one example of a communication media. Communication media may typically be embodied by computer-readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR), and other wireless media. The term computer-readable media as used herein may include both storage media and communication media.

The computing device 600 may be implemented as a portion of a small-form factor portable (or mobile) electronic device such as a cell phone, a personal data assistant (PDA), a personal media player device, a wireless web-watch device, a personal headset device, an application-specific device, or a hybrid device that includes any of the above functions. The computing device 600 may also be implemented as a personal computer including both laptop computer and non-laptop computer configurations.

The present disclosure is not to be limited in terms of the particular embodiments described herein, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that the present disclosure is not limited to particular methods, reagents, compounds, compositions, or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of performing clock recovery and equalizer coefficient estimation in a multi-channel receiver, the method comprising:
   recovering, at a first clock recovery unit, a first clock signal associated with a first channel;
   estimating a first set of coefficients for a first equalizer associated with the first channel using the first clock signal;
   passing the first clock signal from the first clock recovery unit to a second clock recovery unit associated with a second channel;
   recovering, at the second clock recovery unit, a second clock signal associated with the second channel using the first clock signal as a reference clock signal to the second clock recovery unit;
   passing the first set of coefficients as first initialization coefficients to a second equalizer associated with the second channel; and
   estimating a second set of coefficients for the second equalizer using the first initialization coefficients.

2. The method of claim 1, wherein estimating the second set of coefficients for the second equalizer comprises:
   initializing the second set of coefficients using the first initialization coefficients; and
   estimating the second set of coefficients using an equalization scheme after the initialization.

3. The method of claim 1, wherein the first channel includes a first channel response that is related to a second channel response of the second channel.

4. The method of claim 1, wherein:
   the first channel is associated with a wavelength for which an optical link is optimized; and
   the first channel has a smaller inter-symbol interference (ISI) than the second channel.

5. The method of claim 4, wherein the optical link includes a multi-mode fiber (MMF) link.

6. The method of claim 1, further comprising:
   passing the second clock signal from the second clock recovery unit to a third clock recovery unit associated with a third channel;
   recovering, at the third clock recovery unit, a third clock signal associated with the third channel using the second clock signal as a reference clock signal to the third clock recovery unit;
   passing the second set of coefficients as second initialization coefficients to a third equalizer associated with the third channel;
   estimating a third set of coefficients for the third equalizer based on the second initialization coefficients;
   passing the third clock signal from the third clock recovery unit to a fourth clock recovery unit associated with a fourth channel;
   recovering, at the fourth clock recovery unit, a fourth clock signal associated with the fourth channel using the third clock signal as a reference clock signal to the fourth clock recovery unit;
   passing the third set of coefficients as third initialization coefficients to a fourth equalizer associated with the fourth channel; and
   estimating a fourth set of coefficients for the fourth equalizer based on the third initialization coefficients.

7. The method of claim 6, wherein:
   the second channel is a neighbor channel of the first channel;
   the third channel is a neighbor channel of the second channel; and the fourth channel is a neighbor channel of the third channel.

8. The method of claim 7, wherein:
the first channel is associated with a wavelength of 850 nanometers (nm);
the second channel is associated with a wavelength of 880 nm;
the third channel is associated with a wavelength of 910 nm; and
the fourth channel is associated with a wavelength of 940 nm.

9. The method of claim 6, wherein:
the first channel is associated with a wavelength optimized for performance on an optical link and has a smaller inter-symbol interference (ISI) than the second channel;
the second channel has a smaller ISI than the third channel; and
the third channel has a smaller ISI than the fourth channel.

10. The method of claim 1, wherein:
the first channel is associated with a first wavelength within a range between 800 nanometers (nm) and 1000 nm;
the second channel is associated with a second wavelength within the range between 800 nm and 1000 nm; and
a channel spacing between the first channel and the second channel is within a range between 15 nm and 60 nm.

11. A multi-channel receiver comprising:
a first clock recovery unit configured to recover a first clock signal associated with a first channel, the first clock recovery unit configured to pass the first clock signal to a second clock recovery unit associated with a second channel;
a first coefficient estimation unit configured to estimate a first set of coefficients for a first equalizer associated with the first channel using the first clock signal, the first coefficient estimation unit configured to pass the first set of coefficients to a second coefficient estimation unit;
the second clock recovery unit configured to recover a second clock signal associated with the second channel using the first clock signal as a reference clock signal to the second clock recovery unit; and
the second coefficient estimation unit configured to estimate a second set of coefficients for a second equalizer associated with the second channel using the first set of coefficients as first initialization coefficients for the second equalizer.

12. The receiver of claim 11, wherein the second coefficient estimation unit is further configured to:
initialize the second set of coefficients using the first initialization coefficients; and
estimate the second set of coefficients using an equalization scheme after the initialization.

13. The receiver of claim 11, wherein the first channel has a first channel response that is related to a second channel response of the second channel.

14. The receiver of claim 11, wherein the first channel is associated with a wavelength for which an optical link is optimized and includes a smaller inter-symbol interference (ISI) than the second channel.

15. The receiver of claim 14, wherein the optical link includes one of an OM3 fiber link and an OM4 fiber link.

16. The receiver of claim 11, wherein:
the second clock recovery unit is further configured to pass the second clock signal from the second clock recovery unit to a third clock recovery unit associated with a third channel;
the second coefficient estimation unit is further configured to pass the second set of coefficients from the second coefficient estimation unit to a third coefficient estimation unit as second initialization coefficients; and
the receiver further comprises:
the third clock recovery unit configured to:
recover a third clock signal associated with the third channel using the second clock signal as a reference clock signal to the third clock recovery unit; and
pass the third clock signal from the third clock recovery unit to a fourth clock recovery unit associated with a fourth channel;
the third coefficient estimation unit configured to:
estimate a third set of coefficients for a third equalizer associated with the third channel using the second initialization coefficients; and
pass the third set of coefficients from the third coefficient estimation unit to a fourth coefficient estimation unit as third initialization coefficients;
the fourth clock recovery unit configured to recover a fourth clock signal associated with the fourth channel using the third clock signal as a reference clock signal to the fourth clock recovery unit; and
the fourth coefficient estimation unit configured to estimate a fourth set of coefficients for a fourth equalizer associated with the fourth channel using the third initialization coefficients.

17. The receiver of claim 16, wherein:
the second channel is a neighbor channel of the first channel;
the third channel is a neighbor channel of the second channel; and
the fourth channel is a neighbor channel of the third channel.

18. The receiver of claim 17, wherein:
the first channel is associated with a wavelength of 850 nanometers (nm);
the second channel is associated with a wavelength of 880 nm;
the third channel is associated with a wavelength of 910 nm; and
the fourth channel is associated with a wavelength of 940 nm.

19. A multi-channel receiver comprising:
a demultiplexer (DEMUX) that is configured to receive a laser beam from an optical link, wherein the optical link is optimized for a particular wavelength and the laser beam includes one or more optical carrier signals associated with other wavelengths;
a first clock recovery unit configured to receive a first optical carrier signal of the optical carrier signals from the DEMUX and to recover a first clock signal from the first optical carrier signal;
a second clock recovery unit configured to receive a second optical carrier signal of the optical carrier signals from the DEMUX, to receive a reference clock signal from the first clock recover unit, and to recover a second clock signal using the reference clock signal, wherein:
the first optical carrier signal is associated with a first wavelength;

the second optical carrier signal is associated with a second wavelength;

the first wavelength is between the second wavelength and the particular wavelength; and the reference clock signal is the first clock signal; and a first coefficient estimation unit configured to estimate a first set of coefficients for a first equalizer associated with the first channel using the first clock signal and pass the first set of coefficients as initialization coefficients to a second equalizer associated with the second clock recovery unit.

* * * * *